United States Patent
Jiang et al.

(10) Patent No.: US 8,723,684 B2
(45) Date of Patent: May 13, 2014

(54) BIO-INFORMATION MONITORING SYSTEM

(75) Inventors: Joe-Air Jiang, Taipei (TW); Ta-Te Lin, Taipei (TW); Wen-Dien Chang, Miaoli County (TW); Yung-Cheng Wu, Taipei (TW)

(73) Assignee: National Taiwan University, Taipei (TW)

( * ) Notice: Subject to any disclaimer, the term of this patent is extended or adjusted under 35 U.S.C. 154(b) by 337 days.

(21) Appl. No.: 12/728,107

(22) Filed: Mar. 19, 2010

(65) Prior Publication Data

US 2011/0084850 A1 Apr. 14, 2011

(30) Foreign Application Priority Data

Oct. 13, 2009 (TW) ................................ 98134698 A

(51) Int. Cl.
*G08C 19/02* (2006.01)
(52) U.S. Cl.
USPC .................................. 340/870.16; 340/573.1
(58) Field of Classification Search
USPC ........ 340/870.16, 573.1; 600/300, 301; 705/2
See application file for complete search history.

(56) References Cited

U.S. PATENT DOCUMENTS

| | | | |
|---|---|---|---|
| 8,378,811 B2 * | 2/2013 | Crump et al. ............ | 340/539.11 |
| 2005/0144042 A1 * | 6/2005 | Joffe et al. ....................... | 705/2 |
| 2006/0154642 A1 * | 7/2006 | Scannell, Jr. ............... | 455/404.1 |
| 2006/0247505 A1 * | 11/2006 | Siddiqui ........................ | 600/300 |
| 2009/0146822 A1 * | 6/2009 | Soliman ...................... | 340/573.1 |
| 2009/0273767 A1 * | 11/2009 | Makinouchi .................... | 355/53 |
| 2010/0049005 A1 * | 2/2010 | Espina Perez et al. ........ | 600/300 |
| 2010/0160744 A1 * | 6/2010 | Ha et al. ........................ | 600/301 |

FOREIGN PATENT DOCUMENTS

TW 200742573 A 11/2007

OTHER PUBLICATIONS

Hu et al: "Privacy-Preserving Telecardiology Sensor Networks: Toward a Low-Cost Portable Wireless Hardware/Software Codesign", IEEE Transactions on Information Technology in Biomedicine, vol. 11, No. 6, Nov. 2007, pp. 619-627.
Lorincz et al.: "Sensor Networks for Emergency Response: Challenges and Opportunities"; IEEE CS and IEEE ComSoc 1536-1268/04, 2004 IEEE, pp. 16-23.
Nakauchi et al.: "Dietary and Health Information Logging System for Home Health Care Services", Proceedings of the 2007 IEEE Symposium on Foundations of Computational Intelligence (FOCI 2007), pp. 275-280.

* cited by examiner

*Primary Examiner* — Peguy Jean Pierre

(57) ABSTRACT

A bio-information monitoring system is provided. The bio-information monitoring system comprises a wireless sensor and a first wireless network node. The wireless sensor senses at least a bio-information. The first wireless network node collects the bio-information, wherein the bio-information is monitored in response to a command from a second wireless network node to the first wireless network node.

16 Claims, 4 Drawing Sheets

BIO-INFORMATION MONITORING SYSTEM

FIELD OF THE INVENTION

The present invention relates to a bio-information monitoring system, and more particularly to a wireless sensor network system for bio-information monitoring.

BACKGROUND OF THE INVENTION

According to the preliminary estimation of the population by Council for Economic Planning and Development in 2008, the percentage of the proportion of the aged population above 65 years old is 10.4%, and will be raised to 14% in 2020. The ageing rate in Taiwan is only minor to Japan, which is the second highest in the world. The aged population and chronic diseases rapidly grow up result in the eager demand of long-term caring. At the same time, abusing medicine and diet aberration make the proportion of the patients receiving hemodialysis therapy in Taiwan to become the first in the world. Therefore, the medical quality in the hemodialysis center must be a key point in the future. The nursing staff in hemodialysis center may break off monitoring the bio-information on patients because of being busy or changing duty, or affect the medical quality because of different monitoring frequency or caring many patients by oneself. Thus, it is very helpful for improving the medical quality to apply a wireless sensor network to monitor the bio-information of heart beat rate, blood pressure, etc. in hemodialysis center, and establish a bio-information processing system.

The application of wireless sensor network in medical caring is very widespread, comprising remote medical caring service such as healthy diagnosis of the tester, emergency internet, drug control inside the hospital, and remotely monitoring any kinds of bio-information of the patients. The wireless sensor network technology could also be used in detecting the action of the aged living alone, which makes the user more convenient in motion by tiny sensor node, and monitoring if some danger conditions are occurred, such as falling down. It also can reduce the condition of taking wrong medicine when pharmacist prescribes by using combination of the sensor node and the drug administration.

In technical literature (Lorincz et al., 2004), K. Lorincz et al. combined the wireless sensor network and the blood oxygen saturated ($SpO_2$) concentration monitoring device to obtain the patient's bio-information. The technical literature (Nakauchi et al., 2007) shows a typically remote home care system, which has the function of wireless transition, but every bio-information has to be transmitted via the cell phone module, and cause a large cost in communication fee. Nowadays, more perfect development of remote caring system as the technical literature (Nakauchi et al., 2007; Hu et al., 2007) shows. The abovementioned caring system often has database system, which still lacks integrality, in which the database is often used for comparing or passively storing data. As a reason of this, a master platform is provided in the present application, which disassociates the data packet transmitted from the wireless sensor network, and then classifies the bio-information automatically for storing the bio-information to the MySQL database. The data processing is automatic and has the conformability.

SUMMARY OF THE INVENTION

The purpose of the present invention is to provide a master platform, which disassociates the data packet transmitted from the wireless sensor network, and then stores the bio-information classifiedly in the MySQL database automatically. The data processing has advantages of processing automatically and having the conformability. In accordance with one aspect of the present invention, a bio-information monitoring system is provided. The bio-information monitoring system comprises a wireless sensor and a first wireless network node. The wireless sensor senses at least a bio-information. The first wireless network node collects the bio-information, wherein the bio-information is monitored in response to a command from a second wireless network node to the first wireless network node.

Preferably, the bio-information monitoring system further comprises a wireless network, wherein the bio-information is collected by the first wireless network node via the wireless network.

Preferably, the wireless network is compatible with at least a standard being one selected from a group consisting of Global System for Mobile communications (GSM), General Packet Radio Service (GPRS), Third-generation Mobile Telecommunication (3G), Worldwide Interoperability for Microwave Access (WiMAX), WiFi, Blue-Tooth, Wireless Personal Area Network (WPAN), Low Rate-Wireless Personal Area Networks (LR-WPAN), and Zigbee.

Preferably, the bio-information comprises one selected from a group consisting of blood pressure, heart beat rate, blood oxygen content, respiration rate, and a combination thereof.

Preferably, the first wireless network node is a personal computer gateway.

Preferably, the bio-information monitoring system is applied to at least one selected from a group consisting of a nursing station, a hemodialysis center, and a remote home care system, wherein the first wireless network node decides whether to send a warning message to the selected one according to the collected bio-information.

Preferably, the first wireless network node has a wireless transmitting-receiving module compatible with a standard of Global System for Mobile communications (GSM).

Preferably, the bio-information monitoring system further comprises the second wireless network node, a database and an internet, wherein the bio-information is transmitted to and stored in the database via the second wireless network node, and is inquired via the internet.

Preferably, the second wireless network node is a message server.

Preferably, the bio-information is transmitted to the second wireless network node via the wireless network.

Preferably, the second wireless network node is linked to the database via the internet.

In accordance with another aspect of the present invention, a bio-information monitoring system is provided. The bio-information monitoring system comprises a sensor and a first node. The sensor senses at least a bio-information. The first node is commanded by a second node to monitor the bio-information.

Preferably, the bio-information monitoring system further comprises a network connected with the sensor and the first node, wherein the network is one of a wire network and a wireless network.

Preferably, the bio-information monitoring system further comprises the second node, a database and an internet, wherein the bio-information is transmitted to and stored in the database via the second node, and is inquired via the internet.

Preferably, the sensor is a wireless sensor, the first node is a personal computer gateway, the second node is a message server, and the database is a relation database being a database of My Structured Query Language (MySQL).

In accordance with a further aspect of the present invention, a method of monitoring a bio-information is provided. The method of monitoring a bio-information comprises steps of (a) transmitting a command from a message server to at least a sensor; and (b) monitoring at least a bio-information in response to the command by the sensor.

Preferably, the method after the step (a) further comprises a step of (a1) transmitting the command again if the sensor does not respond to the command.

Preferably, the method after the step (b) further comprises steps of (b1) collecting the bio-information; (b2) transmitting the bio-information to the message server; (b3) determining whether the bio-information is normal; and (b4) sending a warning message when the bio-information is abnormal.

Preferably, the method after the step (b) further comprises steps of (c1) transmitting the bio-information to a database; and (c2) processing the bio-information.

Preferably, the step of processing the bio-information comprising at least one selected from a group consisting of inquiring, amending, adding, and deleting the bio-information.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
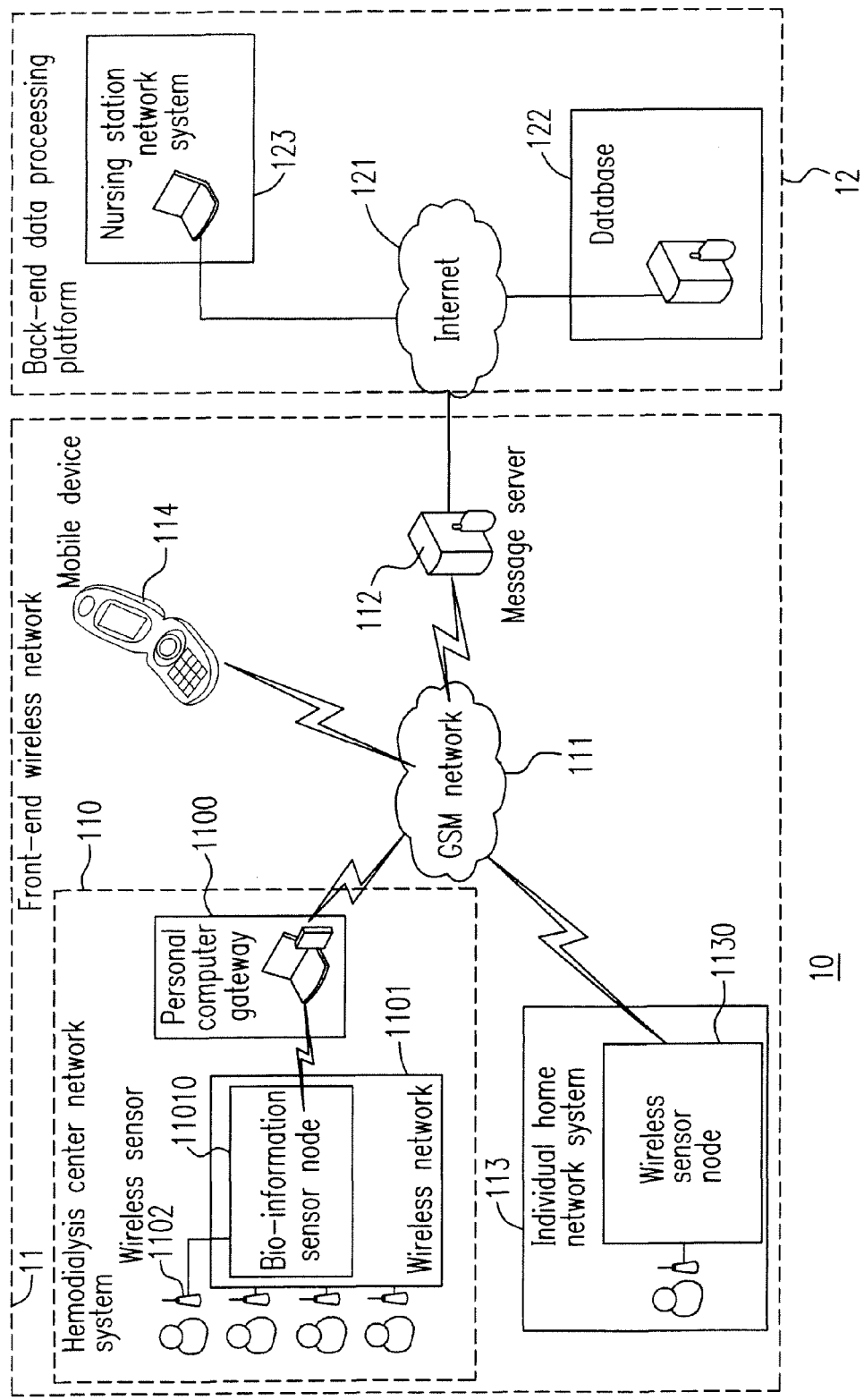
FIG. 1 shows the diagram of the wireless network system according to a preferred embodiment of the present invention.

Please refer to FIG. 1, which shows the diagram of the wireless network system according to a preferred embodiment of the present invention. The wireless network system 10 comprises a front-end wireless network 11 and a back-end data processing platform 12. In a preferable embodiment, the front-end wireless network 11 may comprise a personal computer gateway 1100, a wireless network 1101, a wireless sensor 1102, a GSM network 111, a message server 112, a mobile device 114, and a wireless sensor node 1130. The back-end data processing platform 12 may comprise an internet 121, a database 122, and a nursing station network system 123. The wireless network 1101 comprises at least a bio-information sensor node 11010 coupled to the wireless sensor 1102. A hemodialysis center network system 110, a nursing station network system 123, an individual home network system 113 and a mobile device 114 can exchange information via the wireless network system 10, or be used in the conventional wire network system. The personal computer gateway 1100 and the message server 112 are comprised in a LabVIEW platform (not shown), wherein the LabVIEW platform can process the data thereof and make a decision according to the data. The personal computer gateway 1100 further comprising a GSM module (not shown) connects to the GSM network 111 via the GSM module of the personal computer gateway 1100, wherein the personal computer gateway 1100 can arbitrarily connect to the gateway of the wireless network, comprising at least one of a notebook, a personal computer and a personal digital assistant. The individual home network system 113 comprises at least a wireless sensor node 1130. The wireless network 1101 is compatible with at least a standard being one selected from a group consisting of Global System for Mobile communications (GSM), General Packet Radio Service (GPRS), Third-generation Mobile Telecommunication (3G), Worldwide Interoperability for Microwave Access (WiMAX), WiFi, Blue-Tooth, Wireless Personal Area Network (WPAN), Low Rate-Wireless Personal Area Networks (LR-WPAN), and Zigbee.

The wireless sensor 1102 senses at least a bio-information. Then the bio-information is transmitted to the bio-information sensor node 11010. The wireless network 1101 is configured in a hemodialysis center network system 110, which is effective in a short distance transmitting area to collect the bio-information received in the bio-information sensor node 11010, and then transmit the bio-information to the personal computer gateway 1100 via the GSM network 111. A remote user can measure oneself in the individual home network system 113 and transmit the bio-information to the personal computer gateway 1100 via the GSM network 111. The bio-information monitoring system according to the present application can arbitrarily be applied to at least one selected from a group consisting of a nursing station, a hemodialysis center, and a remote home care system.

The personal computer gateway 1100 is the first network node whose main function is to collect data of the bio-information sensor node 11010 and then the collected data is transmitted to the remote message server 112 by the brief message transmitting program established in the LabVIEW platform via the GSM network 111. The message server 112 is a second wireless network node, receives the data of the personal computer gateway 1100, uses the data processing program of the LabVIEW platform to process a string data of the data, and stores the processed string data to the database 122 via the open database connection and the internet 121, wherein the database 122 is a MySQL database. The MySQL database is a rapid, multi-execution-sequence, multi-user associated database, and can use the structure query language to perform inquiring, updating, adding or deleting the bio-information on the database 122. Via the internet 121, the bio-information data in the database 122 can be inquired, updated, added or deleted by the homepage.

The nodes in the wireless network 1101 are classified as a bio-information sensor node 11010 and a data collection node. By means of direct communications between the bio-information sensor node 11010 and the data collection node, the data collection node transmits the bio-information monitoring command to the bio-information sensor node 11010, and the data of the bio-information sensor node 11010 are collected by the data collection node. For instance, the personal computer gateway 1100 commands the bio-information sensor node 11010 to detect the physiological condition.

In the wireless network 1101, the bio-information sensor node 11010 is a low power device, and has a Zigbee transfer module of low power and energy saving. When the bio-information sensor node 11010 is not monitoring, it is under a condition of energy saving.

The wireless network 1101 can be applied in the hemodialysis center network system 110. In the clinical definition, intradialytic hypotension is that systolic pressure reduces by 20 mmHg and mean arterial pressure (MAP) reduces by 10 mmHg in hemodialysis. The LabVIEW platform runs operation by using equations of MAP=diastolic pressure+⅓ pulse pressure, and pulse pressure=systolic pressure−diastolic pressure to monitor, records the danger value of systolic pressure and mean arterial pressure, and issues the brief message of the danger value via the message server 112. The bio-information is an arbitrary combination of blood pressure value, heart beat rate value, blood oxygen content value and respiration rate value, and can be any sensed bio-information.

Figure 2:
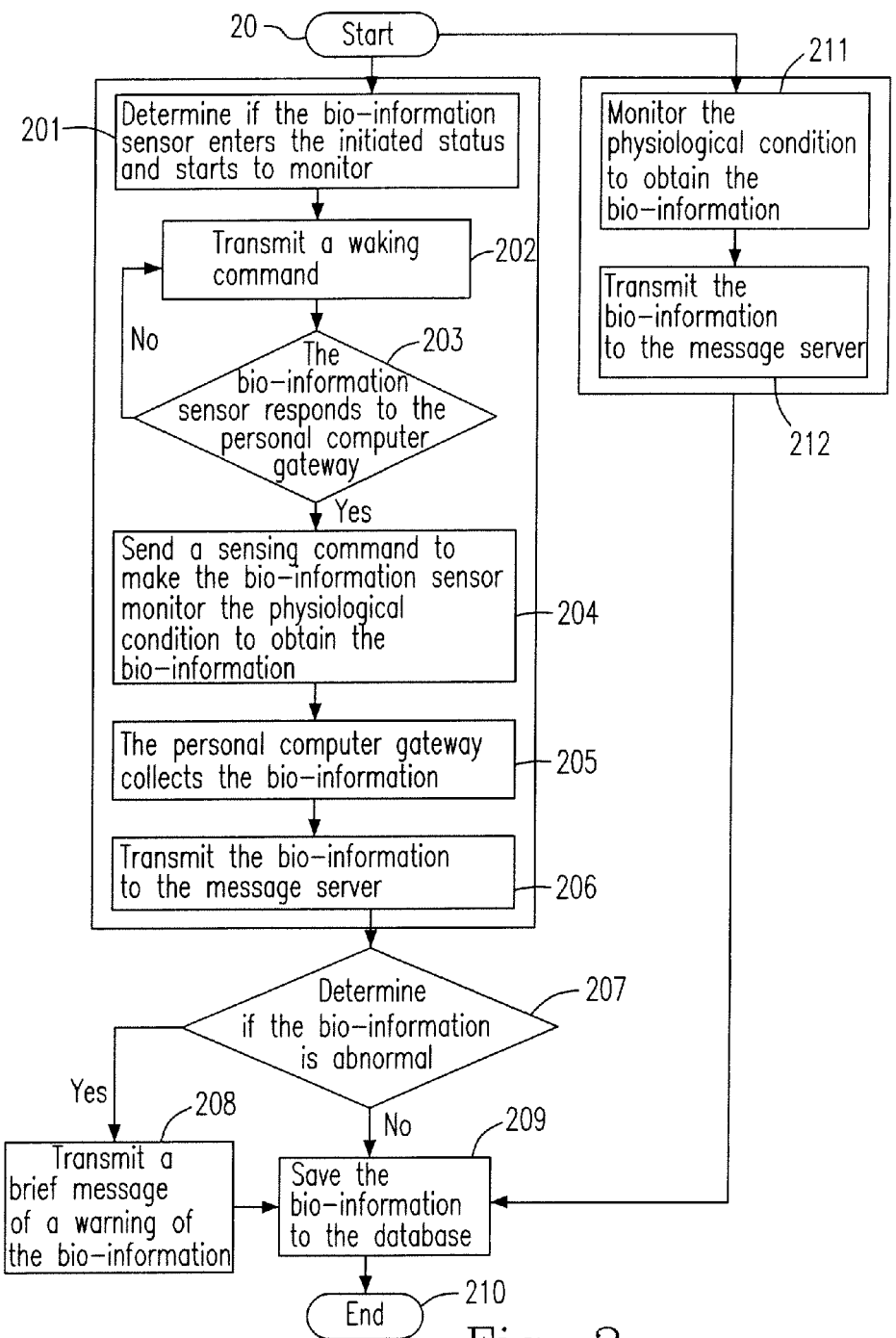
FIG. 2 shows the flow chart of the procedure of the wireless network system according to a preferred embodiment of the present invention.

Please refer to FIG. 2, which shows the flow chart of the procedure of the wireless network system 10 according to a preferred embodiment of the present invention. At first, the LabVIEW platform sends out a control command in the step 20; in the step 201, after the bio-information sensor node 11010 in the hemodialysis center network system 110 has received the control command, if the bio-information sensor 1102 enters the initiated status and starts to monitor the physiological condition for obtaining the bio-information is determined. In the mean time of the step 211, after the wireless sensor node 1130 of the individual home network system 113 has received the control command, sensing the physiological condition to obtain the bio-information starts. To avoid the crash and lost of the responsive data, the sending interval of the control command is 250 ns. In the step 212, the wireless sensor node 1130 transmits the bio-information to the message server 112.

In the step 202, the personal computer gateway 1100 transmits a waking command. In the step 203, the assigned bio-information sensor receiving the waking command will be waken from the dormancy status, and respond to the personal computer gateway 1100 with that the waking command is received validly, which represents the first stage of waking and confirming has been finished, and the procedure enters the second stage. If the personal computer gateway 1100 does not receive the responsive message, the personal computer gateway 1100 will transmit the waking command again until the bio-information sensor responds.

In the step 204, the LabVIEW platform sends a sensing command to the bio-information sensor, promoting the waken bio-information sensor to monitor the physiological condition of heart beat rate, systolic pressure and diastolic pressure etc. for obtaining the bio-information. The sending interval of the sensing command is initially set to 20 seconds, the personal computer gateway 1100 receives the calculation result of a mean arterial pressure difference, and then the LabVIEW platform will generate different monitoring interval according to the calculation result of the mean arterial pressure difference.

In the step 205, after the bio-information monitoring is finished, the bio-information, monitoring date, time and user code are transmitted to the message server 112 via the GSM module, and then the LabVIEW platform continues to send out the sensing command to a next bio-information sensor to make it sensing the bio-information, and determines the next monitoring mode, the next monitoring enters, according to the calculation result of the mean arterial pressure difference. There are three different modes configured in the LabVIEW platform, and according to the calculation result of the mean arterial pressure difference, the LabVIEW platform can perform fixed time monitoring at different time interval.

The personal computer gateway 1100 sends out the command to each bio-information sensor, e.g. 1102, in the ward of the hemodialysis center network system 110 via this way one by one, receives data, and transmits the bio-information to the message server 112 to finish the automatic monitoring and sampling of the bio-information. A tactic of sending command one by one is employed in order to avoid the condition of data crash generated in the wireless sensor node 1130 and all of the bio-information sensor node 11010 during a many-to-one communication, ensure high returning rate of the data, and reduce the fault rate.

In the step 206, after the bio-information is received by the message server 112 via the GSM module, the LabVIEW platform decodes the bio-information into the decimal format. In the step 207, when decoding is being processed, the program of the LabVIEW platform will make a decision. That is to say, when the mean arterial pressure over a normal value is detected, the LabVIEW platform will send a brief message containing warning of the bio-information via the GSM module, and show a graph of a warning value and a bio-information on the message server 112, wherein the normal value is a value under the normal physiological condition. The program of the LabVIEW platform of the personal computer gateway 1100 also determines and shows the graph of the warning value and the bio-information, and then corresponding actions can be taken to deal with the emergency condition promptly.

In the step 208, if the program of the LabVIEW platform of the message server 112 determines that the bio-information is abnormal, the brief message containing a warning of bio-information will be first transmitted to the personal computer gateway 1100, the wireless sensor node 1130 and the mobile device 114 to take corresponding actions under the emergency condition, and then the data will be saved to the database 122. In the step 209, if the program of the LabVIEW platform of the message server 112 determines that the bio-information is not abnormal, then the bio-information is saved to the database 122 via the internet 121.

Figure 3:
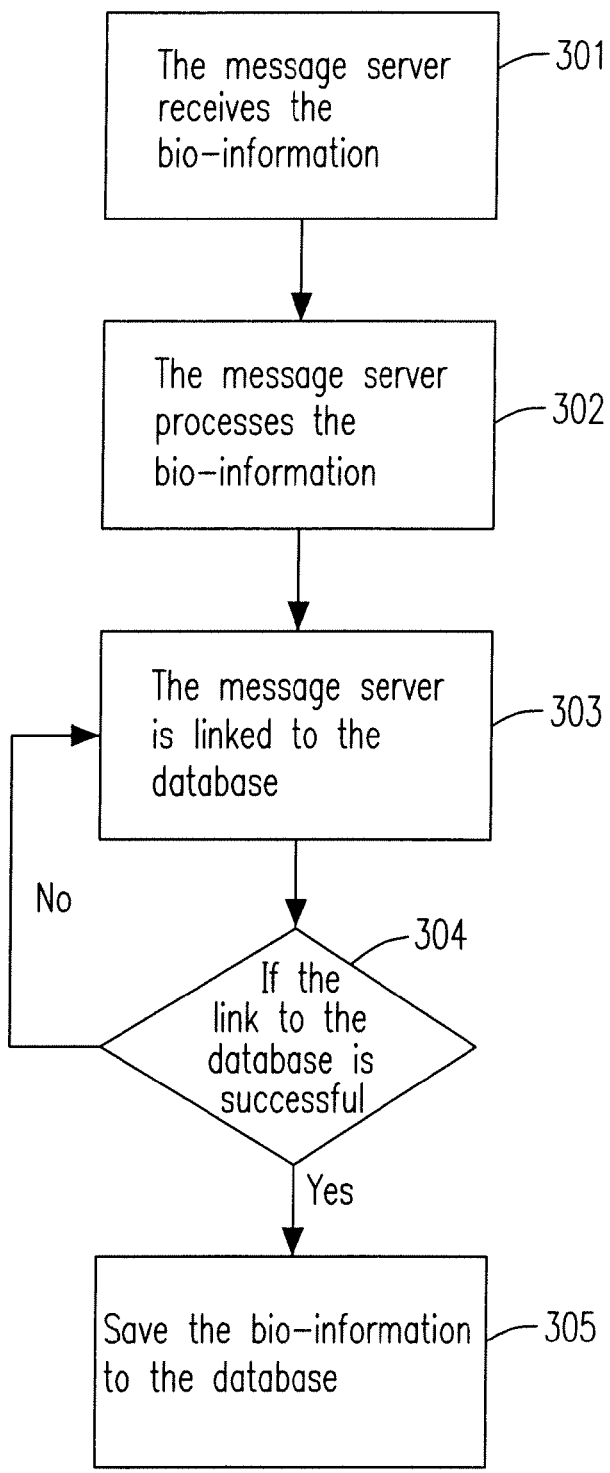
FIG. 3 shows the flow chart of the connection of the LabVIEW platform program and the database according to a preferred embodiment of the present invention.

Please refer to FIG. 3, which shows the flow chart of the connection of the LabVIEW platform program and the database according to a preferred embodiment of the present invention. The system of the database 122 of the present invention is preferably established of MySQL, and then the LabVIEW platform connects to the database 122 by means of ODBC to execute SQL command whose advantage is to execute the required action directly by the MySQL command format, and it is not required that the command format is transformed by the object of the LabVIEW platform.

In the step 301, the message server 112 receives the bio-information. In the step 302, the message server 112 processes the bio-information. In the step 303, the message server 112 is linked to the database 122. According to the past experimental program, the LabVIEW program may perform other procedure before not being linked to the database 122 successfully yet, which results in data lost of the database 122. To ensure zero-error rate of the database 122, the link of the database 122 and the action of saving data are processed separately. Only when the condition that the message server 112 and the database 122 linked successfully is satisfied, it is allowable to save the data of the bio-information to the database 122.

Accordingly, in the step 304, the message server 112 ensures whether the link to the database 122 is successful first. If the link is not successful yet, the procedure comes back to step 303. Until the link to the database 122 is successful, the procedure enters to the step 305 to save the bio-information to the database 122. After the bio-information is saved in the database 122, it can be inquired, updated, added or deleted via the internet 121.

Figure 4:
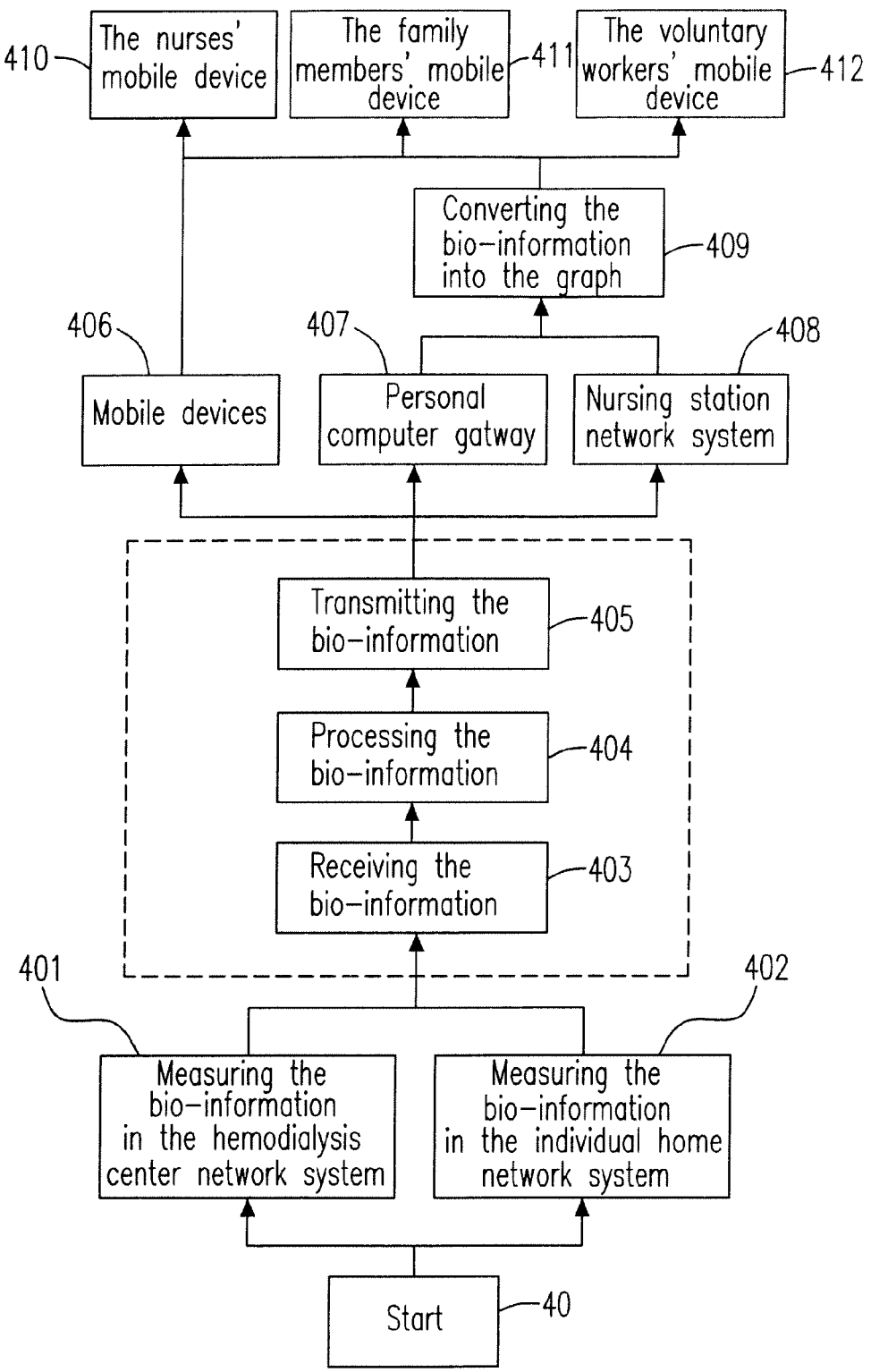
FIG. 4 shows the flow chart of a home bio-information warning notice system according to a preferred embodiment of the present invention.

Please refer to FIG. 4, which shows the flow chart of a home bio-information warning notice system according to a preferred embodiment of the present invention. When the wireless sensor node 1130 uses the wireless sensor 1102 to measure the bio-information automatically, and is coupled to the GSM module, the bio-information can be transmitted to the message server 112 automatically. The information through data process will be uploaded to the database 122 via ODBC to finish monitoring and sampling of the bio-information. After the message server 112 receives the bio-information, the LabVIEW platform program calculates the MAP and filters the heart beat rate. When the MAP and the filtered heart beat rate are abnormal, the LabVIEW platform program sends out the brief message containing the warning of the bio-information via the GSM module, and shows a graph of a warning value and a bio-information on the screen of the message server 112.

In the step 40, it is prepared to measure the physiological condition for obtaining the bio-information. In the step 401, the obtained bio-information after being measured in the hemodialysis center network system 110 is transmitted to the personal computer gateway 1100 via the bio-information sensor node 11010. In the step 402, after the physiological condition at the remote end is measured and the bio-information is obtained, the bio-information is transmitted to the personal computer gateway 1100 via the GSM module.

The steps 403, 404 and 405 are data process procedures. In the step 403, the bio-information is received. In the step 404, the bio-information is processed. In the step 405, the bio-information is transmitted. The bio-information is transmitted to three places at the same time. In the step 406, the bio-information is transmitted to the mobile devices 114. In the step 407, the bio-information is transmitted to the personal computer gateway 1100. In the step 408, the bio-information is transmitted to the nursing station network system 123.

In the step 409, the bio-information is converted to a graph via the LabVIEW platform program. In the step 410, 411 and 412, the bio-information or the graph is transmitted to the mobile devices of the nurses, the family members and the voluntary workers.

Based on the above, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A bio-information monitoring system, comprising:
a wireless sensor sensing at least a bio-information;
a first wireless network including a bio-information sensor node for collecting the bio-information; and
a processing platform processing the bio-information, making a decision as to whether the bio-information is abnormal, sending a message if the bio-information is decided as abnormal, and including:
a personal computer gateway directly communicating with the wireless sensor through the bio-information sensor node, collecting the bio-information, and determining and showing a graph of the abnormal bio-information;
a second wireless network connected to the personal computer gateway; and
a message server connected to the second wireless network, communicating with the personal computer gateway via the second wireless network and receiving the bio-information via the second wireless network, wherein the bio-information is monitored in response to a command from the personal computer gateway via the first wireless network.

2. A bio-information monitoring system as claimed in claim 1, wherein the bio-information has a value and is collected by the personal computer gateway via the first wireless network, the bio-information is decided as abnormal when the value is over a predetermined normal value, the message has a warning of the abnormal bio-information, and at least one of the personal computer gateway and the message server shows the graph of the abnormal bio-information.

3. A bio-information monitoring system as claimed in claim 2, wherein the first wireless network is compatible with at least a standard being one selected from a group consisting of WiFi, Blue-Tooth, Wireless Personal Area Network (WPAN), Low Rate-Wireless Personal Area Networks (LR-WPAN) and Zigbee.

4. A bio-information monitoring system as claimed in claim 1, wherein the bio-information comprises one selected from a group consisting of blood pressure, heart beat rate, blood oxygen content, respiration rate, and a combination thereof.

5. A bio-information monitoring system as claimed in claim 1, being applied to at least one selected from a group consisting of a nursing station, a hemodialysis center, and a remote home care system, wherein the first wireless network node decides whether to send a warning message to the selected one according to the collected bio-information.

6. A bio-information monitoring system as claimed in claim 1, wherein the first wireless network node has a wireless transmitting-receiving module which is compatible with at least a standard being one selected from a group consisting of Global System for Mobile communications (GSM), General Packet Radio Service (GPRS), Third-generation Mobile Telecommunication (3G), Worldwide Interoperability for Microwave Access (WiMAX).

7. A bio-information monitoring system as claimed in claim 1, further comprising:
a database; and
an internet,
wherein the bio-information is transmitted to and stored in the database via the message server, and is inquired via the Internet.

8. A bio-information monitoring system as claimed in claim 7, wherein the message server is linked to the database via the internet.

9. A bio-information monitoring system, comprising:
a sensor sensing at least a bio-information;
a first wireless network collecting the bio-information; and
a processing platform including a first node and a second node, processing the bio-information, and making a decision as to whether the bio-information is abnormal, wherein the first node directly communicates with the sensor through the first wireless network, is commanded by the second node to monitor the bio-information and determines a graph of an abnormal bio-information.

10. A bio-information monitoring system as claimed in claim 9, further comprising:
a database; and
an internet, wherein the bio-information is transmitted to and stored in the database via the second node, and is inquired via the internet.

11. A bio-information monitoring system as claimed in claim 10, wherein the sensor is a wireless sensor, the first node is a personal computer gateway, the second node is a message server, and the database is a relation database being a database of My Structured Query Language (MySQL).

12. A method of monitoring a bio-information, comprising steps of:
providing a processing platform having a first wireless network node and a message server;
transmitting a command from the first wireless network node to at least a sensor directly communicating with the first wireless network node; and
monitoring at least a bio-information in response to the command from the first wireless network node; and
making a decision as to whether the bio-information is abnormal and determines a graph of an abnormal bio-information by the first wireless network node.

13. A method as claimed in claim 12, further comprising a step of:
transmitting the command again if the sensor does not respond to the command.

14. A method as claimed in claim 12, further comprising steps of:
collecting the bio-information;
transmitting the bio-information to the message server; and
sending a warning message when the bio-information is abnormal.

15. A method as claimed in claim 12, further comprising steps of:
transmitting the bio-information to a database; and
processing the bio-information.

16. A method as claimed in claim 15, wherein the step of processing the bio-information comprising at least one selected from a group consisting of inquiring, amending, adding, and deleting the bio-information.

* * * * *